US012093550B2

(12) United States Patent
Lee et al.

(10) Patent No.: US 12,093,550 B2
(45) Date of Patent: Sep. 17, 2024

(54) PER-SERVICE STORAGE OF ATTRIBUTES

(71) Applicant: EMC IP Holding Company LLC, Hopkinton, MA (US)

(72) Inventors: John H. Lee, Durham, NC (US); Michael C. Brundage, Cary, NC (US); Nagapraveen V. Seela, Cary, NC (US); Alan L. Taylor, Cary, NC (US); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/386,873

(22) Filed: Jul. 28, 2021

(65) Prior Publication Data
US 2023/0029728 A1 Feb. 2, 2023

(51) Int. Cl.
G06F 12/00 (2006.01)
G06F 3/06 (2006.01)
G06F 13/00 (2006.01)
G06F 16/13 (2019.01)
G06F 16/22 (2019.01)

(52) U.S. Cl.
CPC ............ G06F 3/0641 (2013.01); G06F 3/061 (2013.01); G06F 3/0631 (2013.01); G06F 3/0659 (2013.01); G06F 3/0683 (2013.01); G06F 16/137 (2019.01); G06F 16/2246 (2019.01)

(58) Field of Classification Search
CPC ...... G06F 3/0641; G06F 3/061; G06F 3/0631; G06F 3/0659; G06F 3/0683; G06F 16/2246; G06F 16/137

USPC ........................................................ 711/154
See application file for complete search history.

(56) References Cited

U.S. PATENT DOCUMENTS

| | | | | |
|---|---|---|---|---|
| 5,089,952 A | * | 2/1992 | Bozman | G06F 16/13 |
| | | | | 710/200 |
| 5,218,696 A | * | 6/1993 | Baird | G06F 16/13 |
| | | | | 707/E17.037 |
| 6,693,766 B1 | * | 2/2004 | Wilkes | G11B 5/59611 |
| 7,606,868 B1 | * | 10/2009 | Le | G06F 16/10 |
| | | | | 718/1 |
| 7,774,391 B1 | * | 8/2010 | Le | G06F 16/188 |
| | | | | 707/999.001 |
| 7,849,057 B1 | * | 12/2010 | Kazar | G06F 16/128 |
| | | | | 707/637 |
| 8,176,087 B2 | * | 5/2012 | Worrall | G06F 16/13 |
| | | | | 707/802 |

(Continued)

*Primary Examiner* — Sheng Jen Tsai
(74) *Attorney, Agent, or Firm* — BainwoodHuang

(57) ABSTRACT

A method performed by a data storage apparatus of maintaining filesystem object attributes in connection with a plurality of drivers is provided. Each driver of the plurality is configured to operate on a respective set of filesystem objects. The method includes (a) for each driver of the plurality, creating a respective driver-specific storage volume; (b) storing, within each driver-specific storage volume, attributes specific to respective filesystem objects operated on by the driver of that driver-specific storage volume; and (c) while operating a particular driver of the plurality on a particular filesystem object, using values of the stored attributes specific to that particular filesystem object operated on by that particular driver. An apparatus, system, and computer program product for performing a similar method are also provided.

20 Claims, 3 Drawing Sheets

(56) References Cited

U.S. PATENT DOCUMENTS

| | | | | |
|---|---|---|---|---|
| 8,635,429 B1* | 1/2014 | Naftel | G06F 11/1469 | 711/206 |
| 8,689,291 B2* | 4/2014 | Cui | G06F 9/4401 | 713/168 |
| 8,880,488 B1* | 11/2014 | Xie | G06F 16/178 | 707/704 |
| 9,020,977 B1* | 4/2015 | Schouten | G06F 16/2255 | 707/796 |
| 9,275,678 B2* | 3/2016 | Amir | G11B 23/042 | |
| 9,753,943 B1* | 9/2017 | Bono | G06F 16/188 | |
| 10,540,166 B2* | 1/2020 | Arikatla | G06F 11/2092 | |
| 10,733,161 B1 | 8/2020 | Davenport et al. | | |
| 10,853,320 B1 | 12/2020 | Bono et al. | | |
| 10,901,847 B2* | 1/2021 | Shani | G06F 11/1076 | |
| 10,936,538 B1* | 3/2021 | Unger | G06F 16/11 | |
| 10,936,551 B1* | 3/2021 | Unger | G06F 16/113 | |
| 10,929,066 B1 | 8/2021 | Nicholson | | |
| 11,086,826 B2* | 8/2021 | Thummala | H04L 63/102 | |
| 11,089,076 B1* | 8/2021 | Thario | H04L 65/612 | |
| 11,294,777 B2* | 4/2022 | Venkatesh | G06F 11/1469 | |
| 11,562,034 B2* | 1/2023 | Arikatla | G06F 16/951 | |
| 11,568,073 B2* | 1/2023 | Nair | G06F 16/192 | |
| 11,733,874 B2* | 8/2023 | Matosevich | G06F 3/0608 | 711/165 |
| 2003/0061399 A1* | 3/2003 | Wagener | G06F 3/0614 | 719/321 |
| 2003/0084198 A1* | 5/2003 | Mandal | G06F 9/465 | 719/316 |
| 2003/0229761 A1* | 12/2003 | Basu | G06F 12/0866 | 711/134 |
| 2004/0107087 A1* | 6/2004 | Fukui | G06F 30/20 | 703/26 |
| 2006/0129614 A1* | 6/2006 | Kim | G06F 11/1469 | |
| 2006/0167838 A1* | 7/2006 | Lacapra | G06F 16/1824 | |
| 2006/0200470 A1* | 9/2006 | Lacapra | G06F 16/10 | |
| 2007/0038697 A1* | 2/2007 | Zimran | G06F 16/166 | 707/E17.01 |
| 2007/0088702 A1* | 4/2007 | Fridella | H04L 61/4552 | 709/219 |
| 2007/0102764 A1* | 5/2007 | Ando | H04N 21/4325 | 348/E5.006 |
| 2007/0130569 A1* | 6/2007 | Heffley | G06F 9/4812 | 718/108 |
| 2007/0180466 A1* | 8/2007 | Ando | H04N 21/42646 | 348/E5.007 |
| 2007/0252724 A1* | 11/2007 | Donaghey | G01D 4/004 | 340/988 |
| 2009/0235110 A1* | 9/2009 | Kurokawa | G06F 11/0727 | 714/E11.023 |
| 2011/0313973 A1* | 12/2011 | Srivas | H04L 65/102 | 707/634 |
| 2012/0036239 A1* | 2/2012 | Donaghey | H04L 41/0886 | 709/221 |
| 2012/0331523 A1* | 12/2012 | Cui | G06F 9/4401 | 710/5 |
| 2015/0379465 A1* | 12/2015 | Wada | G06Q 10/06 | 235/376 |
| 2016/0371296 A1* | 12/2016 | Passey | G06F 16/185 | |
| 2016/0371297 A1* | 12/2016 | Okun | G06F 16/185 | |
| 2017/0308330 A1* | 10/2017 | Suresh | G06F 3/0689 | |
| 2017/0316024 A1* | 11/2017 | Panigrahy | G06F 3/064 | |
| 2018/0365236 A1* | 12/2018 | Wang | G06F 3/0665 | |
| 2019/0258811 A1* | 8/2019 | Ferraiolo | G06F 21/6218 | |
| 2020/0042401 A1* | 2/2020 | Meiri | G06F 11/1464 | |
| 2020/0272600 A1* | 8/2020 | Natanzon | G06F 3/0644 | |
| 2020/0341749 A1* | 10/2020 | Bashi | G06F 3/0604 | |
| 2021/0026827 A1* | 1/2021 | Mathew | G06F 16/174 | |
| 2021/0271561 A1* | 9/2021 | Mathew | G06F 9/30047 | |
| 2021/0294775 A1* | 9/2021 | Keller | G06F 16/1734 | |
| 2021/0303202 A1* | 9/2021 | Ben Zeev | G06F 3/0605 | |
| 2022/0171536 A1* | 6/2022 | Watson | G06F 3/065 | |
| 2022/0276800 A1* | 9/2022 | Savir | G06F 3/067 | |

* cited by examiner

PER-SERVICE STORAGE OF ATTRIBUTES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include layered services, which are drivers that operate on data storage objects (e.g., volumes) to perform various functions. Some layered services may need to store certain attributes in connection with some of the data storage objects on which they operate. For each layered service, these attributes may be stored within an attribute storage area of a hidden volume created for each data storage object.

SUMMARY

Unfortunately, storing attributes in a separate storage volume for every object/layered service combination may lead to an extreme proliferation of storage volumes, which may overwhelm a data storage system. For example, if there are 10,000 user volumes in a system, and there are 50 layered services that operate on those volumes, then there may be a need to create as many as 500,000 hidden volumes to store the layered service attributes. However, creating and maintaining such a large amount of hidden volumes is inefficient. Some storage systems may have a limit to how many volumes they are capable of maintaining. In addition, it is not efficient to maintain an entire storage volume just to store a small amount of attribute data.

Thus, it would be desirable to reduce the number of hidden storage volumes used to store object attributes for layered services. This may be accomplished by maintaining a separate hidden volume for each layered service, but storing attributes for all or many data storage objects operated on by that layered service within that single hidden volume for that layered service. In some embodiments, this may include using a first data structure to organize the data storage objects within the hidden volume for a layered service and then maintaining the attributes for each data storage object within a separate data structure all on the hidden volume for that layered service. In some embodiments, these data structures may be B+ trees.

In one embodiment, a method performed by a data storage apparatus of maintaining filesystem object attributes in connection with a plurality of drivers is provided. Each driver of the plurality is configured to operate on a respective set of filesystem objects. The method includes (a) for each driver of the plurality, creating a respective driver-specific storage volume; (b) storing, within each driver-specific storage volume, attributes specific to respective filesystem objects operated on by the driver of that driver-specific storage volume; and (c) while operating a particular driver of the plurality on a particular filesystem object, using values of the stored attributes specific to that particular filesystem object operated on by that particular driver. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for reducing the number of hidden storage volumes used to store object attributes for layered services. This may be accomplished by maintaining a separate hidden volume for each layered service, but storing attributes for all or many data storage objects operated on by that layered service within that single hidden volume for that layered service. In some embodiments, this may include using a first data structure to organize the data storage objects within the hidden volume for a layered service and then maintaining the attributes for each data storage object within a separate data structure all on the hidden volume for that layered service. In some embodiments, these data structures may be B+ trees.

Figure 1:
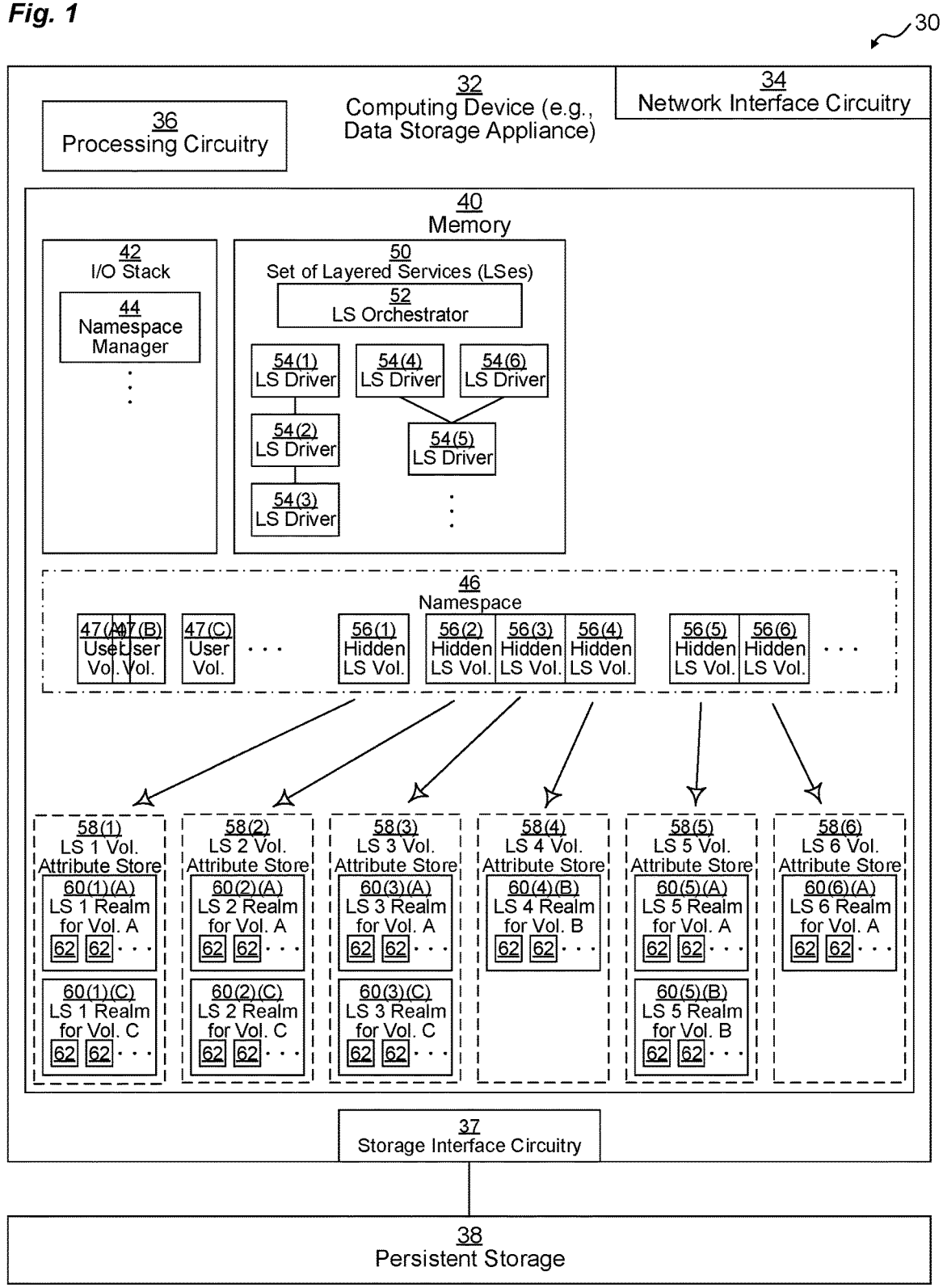
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In an example embodiment, computing device 32 may be a data storage appliance configured to provide access to persistent storage 38.

Computing device 32 may include network interface circuitry 34, processing circuitry 36, storage interface circuitry 37, and memory 40. Computing device 32 may also include other elements, such as, for example, user interface circuitry, a power supply, and various interconnections and buses.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage drives (not depicted), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS), such as a Linux, UNIX, Windows, MacOS, or similar operating system (not depicted) in operation. Memory 40 also stores an input/output driver stack 42, a set 50 of layered service (LS) drivers 54 (depicted as LS drivers 54(1), 54(2), 54(3), 54(4), 54(5), 54(6) . . . ), and other software modules (not depicted) which each execute on processing circuitry 36.

I/O stack 42 includes a set of drivers, including a namespace manager 44 and other storage drivers (not depicted) that operate in a stacked configuration to provide basic storage operations. For example, the I/O stack 42 may take as inputs from a remote host (not depicted) via the network interface circuitry 34, storage commands directed at particular blocks of logical disks or particular files of filesystems, and the I/O stack 42 may transform those input commands into low-level storage operations to be performed on the drives of persistent storage 38. Namespace manager 44 manages a namespace 46 which translates a filesystem structure into a sparse logical address space (e.g., a 64-bit logical address space). Thus, for example, as depicted, namespace 46 includes a plurality of user volumes 47 depicted as user volumes 47(A), 47(B), 47(C), . . . ) and a plurality of hidden LS volumes 56 (depicted as hidden LS volumes 56(1), 56(2), 56(3), 56(4), 56(5), 56(6), . . . ), each of which is mapped by namespace manager 44 to a respective logical address range addressable by a lower-level driver of the I/O stack 42. User volumes 47 are presented to users and remote hosts for storage of data.

The set 50 of LS drivers 54 includes an LS Orchestrator module 52 that manages the operation of the LS drivers 54. LS Orchestrator module 52 translates a User/Control Path command into a sequence of layered service operations. The LS drivers 54 may be arranged in a layered configuration. For example, as depicted, LS driver 54(1) is layered above LS driver 54(2), which itself is layered above LS driver 54(3). In addition, as depicted, LS drivers 54(4) and 54(6) are both layered above LS driver 54(5). An example of an LS driver 54 is a navigator driver, which synchronously mirrors one filesystem object 47 to another filesystem object 47 on a remote system. Another example of an LS driver 54 is a copier driver, which asynchronously copies data from one filesystem object 47 to another filesystem object 47 on a remote system. Another example of an LS driver 54 is a collator driver, which combines several small write commands into a larger write command for efficiency. In some embodiments, the copier driver is layered above the collator driver. Another example of an LS driver 54 is an I/O Coordinator driver, which ensures that, for a given I/O range, new data from one service is not overwritten by older data from the other. In some embodiments, the copier driver and the navigator driver are both layered above the I/O Coordinator driver.

At least some of the LS drivers 54 have a respective associated hidden LS volume 56. Thus, as depicted, LS driver 54(1) is associated with hidden LS volume 56(1), LS driver 54(2) is associated with hidden LS volume 56(2), LS driver 54(3) is associated with hidden LS volume 56(3), LS driver 54(4) is associated with hidden LS volume 56(4), LS driver 54(5) is associated with hidden LS volume 56(5), and LS driver 54(6) is associated with hidden LS volume 56(6). Hidden LS volumes 56 are not presented to users and remote hosts for storage of data. Rather, hidden LS volumes 56 are used to store attributes 62 for their associated LS drivers 54.

Example attributes 62 stored for a copier driver may include an identity of the source filesystem object, an identity of the destination filesystem object(s), a start time, an end time, and a status of a copy operation. Example attributes 62 stored for a navigator driver may include an identity of the source filesystem object, an identity of the destination filesystem object(s), a role indicating whether the filesystem system object is a source or destination of a mirror, and a state of the mirror (indicating, for example, whether the mirror is currently operational, failed, or completed).

In some embodiments, each hidden LS volume 56 stores attributes 62 within a respective LS-specific volume attribute store 58 (depicted as LS 1 volume attribute store 58(1), LS 2 volume attribute store 58(2), LS 3 volume attribute store 58(3), LS 4 volume attribute store 58(4), LS 5 volume attribute store 58(5), and LS 6 volume attribute store 58(6)). In some embodiments, an LS-specific volume attribute store 58(x) is an area of the hidden LS volume 56(x) that stores metadata (including attributes 62) rather than data.

An LS-specific volume attribute store 58 may include one or more realms 60 in which its attributes 62 are organized. Thus, for example, as depicted, LS 1 volume attribute store 58(1) includes a first realm 60(1)(A) that includes attributes 62 that are used by LS driver 54(1) when operating on user volume 47(A) as well as a second realm 60(1)(C) that includes attributes 62 that are used by LS driver 54(1) when operating on user volume 47(C). Similarly, LS 2 volume attribute store 58(2) includes a first realm 60(2)(A) that includes attributes 62 that are used by LS driver 54(2) when operating on user volume 47(A) as well as a second realm 60(2)(C) that includes attributes 62 that are used by LS driver 54(2) when operating on user volume 47(C). Similarly, LS 3 volume attribute store 58(3) includes a first realm 60(3)(A) that includes attributes 62 that are used by LS driver 54(3) when operating on user volume 47(A) as well as a second realm 60(3)(C) that includes attributes 62 that are used by LS driver 54(3) when operating on user volume 47(C).

In addition, LS 4 volume attribute store 58(4) includes only one realm 60(4)(B) that includes attributes 62 that are used by LS driver 54(4) when operating on user volume 47(B), since LS driver 54(4) only operates on user volume 47(B) in this example. Similarly, LS 6 volume attribute store 58(6) includes only one realm 60(6)(A) that includes attributes 62 that are used by LS driver 54(6) when operating on user volume 47(A), since LS driver 54(6) only operates on user volume 47(A) in this example.

Since LS driver 54(5) is layered below both LS drivers 54(4), 54(6) within the example arrangement of the set 50, it must operate on both user volumes 47(B), 47(A), so LS 5 volume attribute store 58(5) includes a first realm 60(5)(A) that includes attributes 62 that are used by LS driver 54(5) when operating on user volume 47(A) as well as a second realm 60(5)(B) that includes attributes 62 that are used by LS driver 54(5) when operating on user volume 47(B).

Further detail of an example arrangement of an LS-specific volume attribute store 58 is described below in connection with FIG. 3.

Memory 40 may also store various other data structures used by the OS, modules 42, 44, 52, 54, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32 is powered off. The OS, modules 42, 44, 52, 54, and various other applications and drivers are typically stored in this persistent storage portion of memory 40 or on persistent storage 38 so that they may be loaded into a system portion of memory 40 upon a system restart or as needed. The OS, modules 42, 44, 52, 54, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

Figure 2:
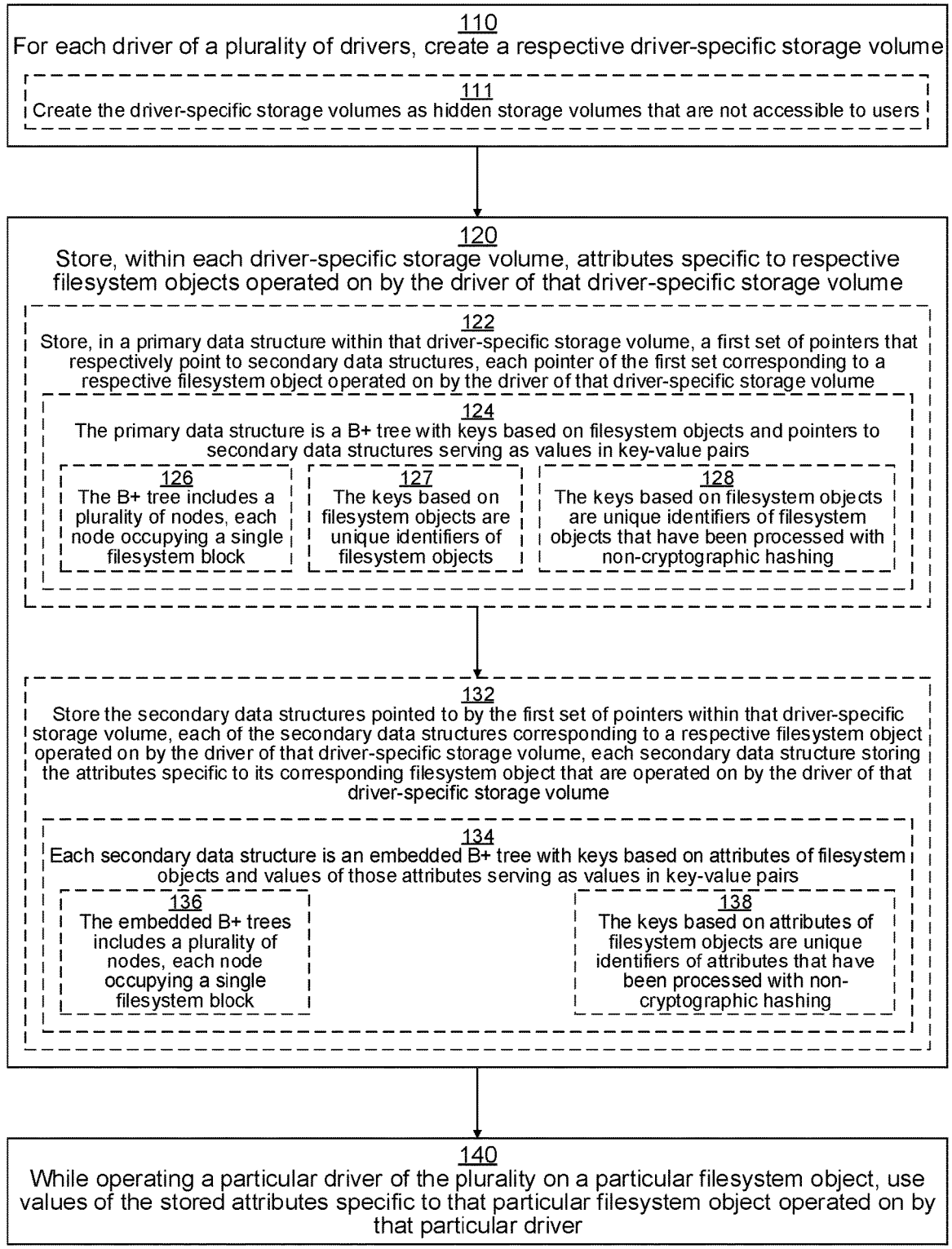
FIG. 2 is a flowchart depicting an example procedure according to various embodiments.

FIG. 2 illustrates an example method 100 performed by computing device 32. It should be understood that any time a piece of software (e.g., OS, modules 42, 44, 52, 54, etc.) is described as performing a method, process, step, or function, what is meant is that a computing device (e.g., computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, for each driver of a plurality of drivers, computing device 32 creates a respective driver-specific storage volume. In some embodiments, step 110 may also include sub-step 111. In sub-step 111, computing device 32 creates the driver-specific storage volumes as hidden storage volumes (e.g., hidden LS volumes 56) that are not accessible to users. In some of these embodiments, the plurality of drivers includes a subset of the layered service drivers 54 of the set 50, and respective driver-specific storage volumes are the hidden LS volumes 56 depicted within namespace 46. It should be understood that the plurality of drivers (e.g., the subset of the set 50 of the layered service drivers 54) may change over time as the needs of the layered service drivers 54 change. In some embodiments, step 110 may include adding a new hidden LS volume 56 to namespace 46 whenever a new layered service driver 54 is added to the subset that needs to store attributes 62. In some embodiments, step 110 may include removing a hidden LS volume 56 from namespace 46 at some point after a layered service driver 54 is removed from the subset that needs to store attributes 62.

In step 120, a driver 54(x) of the plurality stores, within its driver-specific storage volume 56(x), attributes 62 specific to respective filesystem objects (e.g., user volumes 47) operated on by that driver 54(x) associated with that driver-specific storage volume 56(x). In some embodiments, step 120 includes sub-steps 122 and 132.

In sub-step 122, driver 54(x) stores, in a primary data structure within that driver-specific storage volume 56(x), a first set of pointers that respectively point to secondary data structures, each pointer of the first set corresponding to a respective filesystem object (e.g., a user volume 47) operated on by the driver 54(x) of that driver-specific storage volume 56(x). In some embodiments, sub-step 122 includes sub-step 124, which may be illustrated with reference to FIG. 3.

Figure 3:
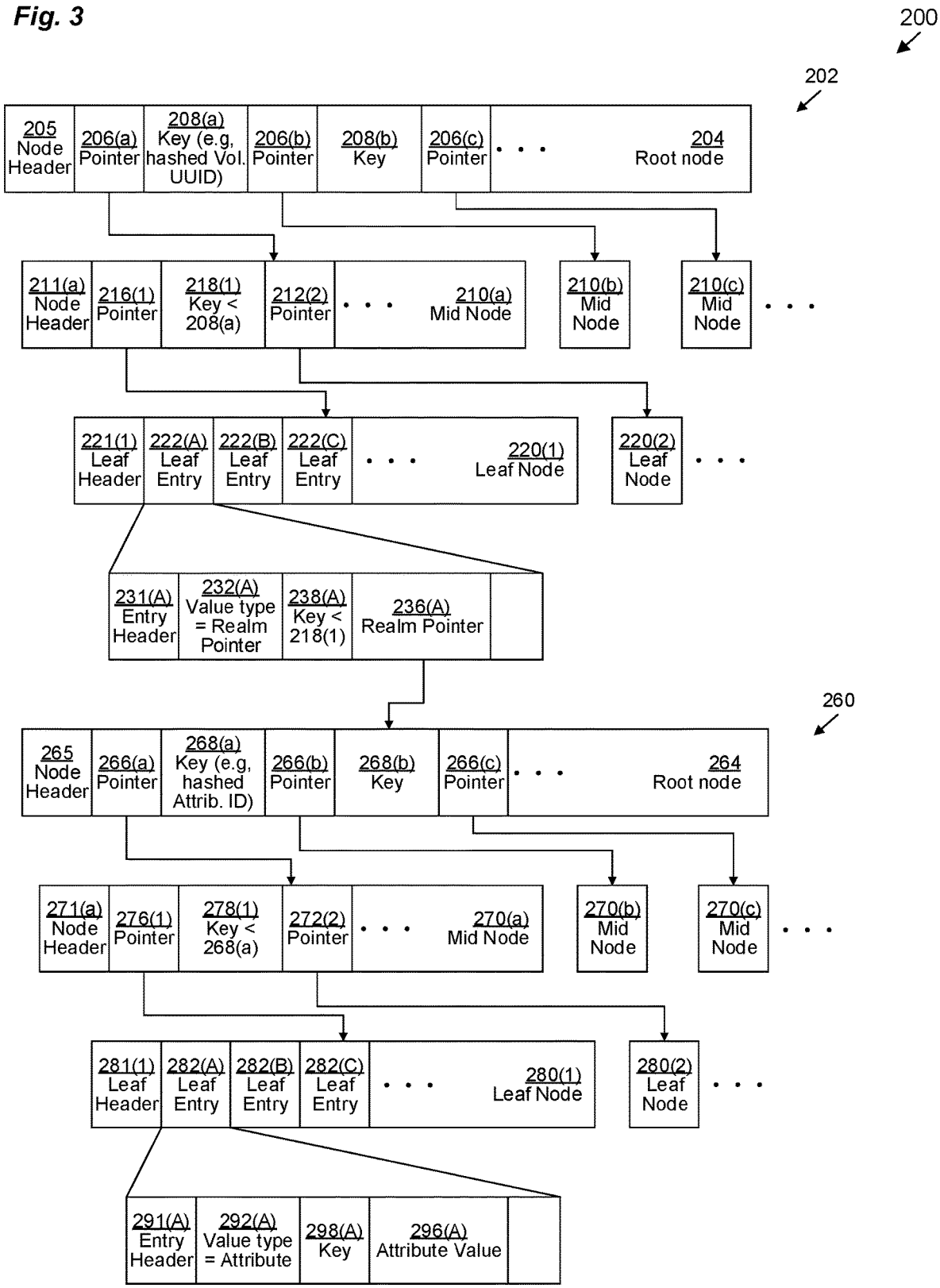
FIG. 3 is a block diagram depicting an example data structure arrangement for use in connection with various embodiments.

FIG. 3 depicts an example arrangement 200 of an LS volume attribute store 58 according to various embodiments. Arrangement 200 includes a primary data structure (PDS) 202 embodied as a B+ tree as well as a secondary data structure (SDS) 260 also embodied as a B+ tree.

Thus, in sub-step 124, PDS 202 is a B+ tree with keys 208, 218, 238 that are based on filesystem objects (e.g., user volumes 47) and pointers 236 to SDSes 260 serving as values in key-value pairs.

PDS 202 includes a root node 204, a set of mid nodes 210 (depicted as mid nodes 210(a), 210(b), 210(c), ... ), and a set of leaf nodes 220 (depicted as leaf nodes 220(1), 220(1), ... ). In some embodiments (see sub-step 126), each node 204, 210, 220 is embodied as a single filesystem block (e.g., a 4-kilobyte or 8-kilobyte storage block).

Leaf nodes 220 store leaf entries 222 (depicted as leaf entries 222(A), 222(B), 222(C), ... ), each of which includes a key-value pair, including a key 238 and a realm pointer 236 that points to a respective SDS 260. In some embodiments (see sub-step 127), the keys 238 are unique identifiers (e.g., universally unique identifiers, UUIDs, or globally unique identifiers, GUIDs) of filesystem objects. In other embodiments (see sub-step 128), the keys 238 are unique identifiers (e.g., UUIDs or GUIDs) that have been processed using non-cryptographic hashing (e.g., using MurmurHash).

Root node 202 includes a root node header 205, a set of pointers 206 that point to mid nodes 210, and a set of keys 208 that define boundaries between the mid nodes 210. In some embodiments, a pointer 206 is a block pointer that points to a filesystem block that embodies a mid node 210, and the block pointer is within a local address space of the hidden LS volume 56. In these embodiments, pointers 206 may take up less space than were they to point within the entire namespace 46. It should be understood that, in some cases, PDS 202 may omit the mid nodes 210, such as, for example, if PDS 202 only includes a small number of keys 238. In such cases, pointers 206 of root node 202 point directly at leaf nodes 220 rather than at mid nodes 210. Root node header 205 may include version information, an identification of the node as being a root node 202, as well as other information, such as a magic number.

Key 208(a) indicates that all keys 238 that are less than key 208(a) may be accessed by traversing PDS 202 through mid node 210(a) pointed at by pointer 206(a). Similarly, key 208(b) indicates that all keys 238 that are less than key 208(b) and also greater than or equal to key 208(a) may be accessed by traversing PDS 202 through mid node 210(b) pointed at by pointer 206(b).

Mid nodes 210 include a mid node header 211, a set of pointers 216 that point to either leaf nodes 220 or other mid nodes 210, and a set of keys 218 that define boundaries between the leaf nodes 220 (or the mid nodes 210 at the next level of PDS 202). In some embodiments, a pointer 216 is a block pointer that points to a filesystem block that embodies a leaf node 220, and the block pointer is within a local address space of the hidden LS volume 56. In these embodiments, pointers 216 may take up less space than were they to point within the entire namespace 46. Mid node header 211 may include version information, an identification of the node as being a mid node 210, as well as other information, such as a magic number.

Key 218(1) indicates that all keys 238 that are less than key 218(1) may be accessed by traversing PDS 202 through leaf node 220(1) pointed at by pointer 216(1). Similarly, key 218(2) indicates that all keys 238 that are less than key 218(2) and also greater than or equal to key 218(1) may be accessed by traversing PDS 202 through leaf node 220(2) pointed at by pointer 216(2).

In one embodiment, root node 204 and mid nodes 210 are each 4 kilobytes, and they are each able to hold up to 338 keys 208, 218 and 339 pointers 206, 216.

Leaf nodes 220 include a leaf node header 221 in addition to the leaf entries 222. Leaf node header 221 may include version information, an identification of the node as being a leaf node 220, as well as other information, such as a magic number.

In addition to a leaf entry 222 including a key 238 and a realm pointer 236, a leaf entry 222 may also include an entry header 231 and various flags, including a value type flag 232 indicating that realm pointer 236 points to an SDS 260 that stores attributes 62 for a filesystem object. Entry header 231 may include information about the lengths of the key 218 and the realm pointer 236, for example.

In one embodiment, leaf nodes 220 are each 4 kilobytes, and they are each able to hold up to 56 leaf entries 222.

In some embodiments, realm pointer 236 is a block pointer that points to a filesystem block that embodies a root node 264 of another B+ tree that embodies SDS 260, and the block pointer is within a local address space of the hidden LS volume 56. In these embodiments, realm pointers 236 may take up less space than were they to point within the entire namespace 46.

Returning to FIG. 2, in sub-step 132, driver 54(x) stores the SDSes 260 pointed to by the first set of pointers within that driver-specific storage volume 56(x), each of the SDSes 260 corresponding to a respective filesystem object (e.g., a user volume 47) operated on by the driver 54(x) of that driver-specific storage volume 56(x), each SDS 260 storing the attributes 62 specific to its corresponding filesystem object that are operated on by the driver 54(x) of that driver-specific storage volume 56(x). In some embodiments, sub-step 132 includes sub-step 134.

In sub-step 134, SDS 260 is a B+ tree with keys 268, 278, 298 that are based on attributes 62 of filesystem objects (e.g., user volumes 47) and values of those attributes 62 serving as values in key-value pairs.

As depicted, SDS 260 has a similar structure to PDS 202, with nodes 264, 270, 280. In some embodiments (see sub-step 136), each node 264, 270, 280 is embodied as a single filesystem block (e.g., a 4-kilobyte or 8-kilobyte storage block). Thus, root node 260 includes a node header 265, a set of pointers 266 that point to mid nodes 270, and a set of keys 268 that define boundaries between the mid nodes 270. In some embodiments, a pointer 266 is a block pointer that points to a filesystem block that embodies a mid node 270, and the block pointer is within a local address space of the hidden LS volume 56. In these embodiments, pointers 266 may take up less space than were they to point within the entire namespace 46. It should be understood that, in some cases, SDS 260 may omit the mid nodes 270, such as, for example, if SDS 260 only includes a small number of keys 298. In such cases, pointers 266 of root node 264 point directly at leaf nodes 280 rather than at mid nodes 270. Root node header 265 may include version information, an identification of the node as being a root node 264, as well as other information, such as a magic number.

Key 268(a) indicates that all keys 298 that are less than key 268(a) may be accessed by traversing SDS 260 through mid node 270(a) pointed at by pointer 266(a). Similarly, key 268(b) indicates that all keys 298 that are less than key 268(b) and also greater than or equal to key 268(a) may be accessed by traversing SDS 260 through mid node 270(b) pointed at by pointer 216(b).

Mid nodes 270 include a mid node header 271, a set of pointers 276 that point to either leaf nodes 280 or other mid nodes 270, and a set of keys 278 that define boundaries between the leaf nodes 280 (or the mid nodes 270 at the next level of SDS 260). In some embodiments, a pointer 276 is a block pointer that points to a filesystem block that embodies a leaf node 280, and the block pointer is within a local address space of the hidden LS volume 56. In these embodiments, pointers 276 may take up less space than were they to point within the entire namespace 46. Mid node header 271 may include version information, an identification of the node as being a mid node 270, as well as other information, such as a magic number.

Key 278(1) indicates that all keys 298 that are less than key 278(1) may be accessed by traversing SDS 260 through leaf node 280(1) pointed at by pointer 276(1). Similarly, key 278(2) indicates that all keys 298 that are less than key 278(2) and also greater than or equal to key 278(1) may be accessed by traversing SDS 260 through leaf node 280(2) pointed at by pointer 276(2).

In one embodiment, root node 264 and mid nodes 270 are each 4 kilobytes, and they are each able to hold up to 338 keys 268, 278 and 339 pointers 266, 276.

Leaf nodes 280 store leaf entries 282 (depicted as leaf entries 282(A), 282(B), 282(C), . . . ), each of which includes a key-value pair, including a key 298 and an attribute value 296, which is the value of an attribute 62 for the filesystem object 47 represented by the SDS 260 in the context of operation of the LS driver 54(x) in whose hidden LS volume 56(x) the SDS 260 is stored. As an example, one attribute 62 used for a collator driver is "Optimal Write Size," and the attribute value 296(a) for one user volume 47(a) is 64 kilobytes, while the attribute value 296(b) for another user volume 47(b) is 128 kilobytes.

In some embodiments (see sub-step 138), the keys 298 are locally-unique identifiers (e.g., attribute names) of filesystem objects that have been processed using non-cryptographic hashing (e.g., using MurmurHash).

Leaf nodes 280 include a leaf node header 281 in addition to leaf entries 282. Leaf node header 281 may include version information, an identification of the node as being a leaf node 280, as well as other information, such as a magic number. In addition to a leaf entry 282 including a key 298 and an attribute value 296, a leaf entry 282 may also include an entry header 291 and various flags, including a value type flag 292 indicating that attribute value 296 is the value of an attribute 62 for a filesystem object. Entry header 291 may include information about the lengths of the key 298 and the attribute value 296, for example. In some embodiments, attribute value 296 may be up to 40 bytes long.

In one embodiment, leaf nodes 280 are each 4 kilobytes, and they are each able to hold up to 56 leaf entries 282.

Returning to FIG. 2, in step 140, while operating a particular driver (e.g., an LS driver 54(x)) of the plurality on a particular filesystem object (e.g., user volume 47(y)), that driver 54(x) uses values 296 of the stored attributes 62 specific to that particular filesystem object 47(y) operated on by that particular driver 54(x). In some embodiments, step 140 is done by first locating the leaf node 220 within the PDS 202 for the hidden LS volume 56(x) for that LS driver 54(x) which contains a key 238(Z) that is based on the unique identifier of that particular filesystem object 47(y).

Then, the realm pointer 236(Z) associated with that key 238(Z) in leaf entry 222(Z) is followed to locate the appropriate SDS 260(Z) for that particular filesystem object 47(y) also within the hidden LS volume 56(x) for that LS driver 54(x). Then, LS driver 54(x) locates the leaf node 280 within that SDS 260(Z) which contains a key 298(W) that is based on the locally-unique identifier of the desired attribute 62. Then, LS driver 54(x) obtains the attribute value 296(W) from leaf entry 282(W).

Thus, techniques have been presented techniques for reducing the number of hidden storage volumes 56 used to store object attributes 62 for LS drivers 54. This may be accomplished by maintaining a separate hidden volume 56 for each LS driver 54, but storing attributes 62 for all or many data storage objects (e.g., user volumes 47) operated on by an LS driver 54(x) within that single hidden volume 56(x) for that LS driver 54(x). In some embodiments, this may include using a first data structure 202 to organize the data storage objects (e.g., user volumes 47) within the hidden volume 56(x) for an LS driver 54(x) and then maintaining the attributes 62 for each data storage object (e.g., user volumes 47) within a separate data structure 260 all on the hidden volume 56(x) for that LS driver 54(x). In some embodiments, these data structures 202, 260 may be B+ trees.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

The word "each," when used in conjunction with members of a "set," means that each and every member of the set has a particular feature, but there may be additional similar items that are not members of the set and do not have the particular feature. Thus, for example, the statement that "each of a set of devices is blue" means that for a particular set of devices, each of those devices is blue, but it does not mean to exclude the possibility that there are additional devices not in the set that are not blue.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method performed by a data storage apparatus of maintaining filesystem object attributes in connection with a plurality of drivers, each driver of the plurality being configured to operate on a respective set of filesystem objects, the method comprising:
   for each driver of the plurality, creating a respective driver-specific storage volume, each driver of the plurality of drivers being a software programming construct constructed and arranged to perform volume-based storage activities and providing a respective layer of operational processing, each driver-specific storage volume created for a different driver of the plurality of drivers in a one-to-one relationship;
   storing, within each driver-specific storage volume, an indicator of each of the set of filesystem objects with which the respective driver is configured to operate and, for each indicated filesystem object, attributes specific to the respective filesystem object operated on by the driver of that driver-specific storage volume; and
   while operating a particular driver of the plurality on a particular filesystem object, using values of the stored attributes specific to that particular filesystem object operated on by that particular driver,
   wherein storing, within each driver-specific storage volume, attributes specific to respective filesystem objects operated on by the driver of that driver-specific storage volume includes providing first and second B+ trees, the first B+ tree mapping identifiers of user volumes to respective leaves, the leaves corresponding to respective user volumes and including pointers to respective attribute realms, the second B+ tree mapping the respective attribute realms to respective attribute values.

2. The method of claim 1 wherein:
   each respective set of filesystem objects includes a user-accessible storage volume; and
   creating the respective driver-specific storage volume for each driver of the plurality includes creating the driver-specific storage volumes as hidden storage volumes that are not accessible to users.

3. The method of claim 1 wherein storing attributes specific to respective filesystem objects within each driver-specific storage volume includes:
- storing, in a primary data structure within that driver-specific storage volume, a first set of pointers that respectively point to secondary data structures, each pointer of the first set corresponding to a respective filesystem object operated on by the driver of that driver-specific storage volume; and
- storing the secondary data structures pointed to by the first set of pointers within that driver-specific storage volume, each of the secondary data structures corresponding to a respective filesystem object operated on by the driver of that driver-specific storage volume, each secondary data structure storing the attributes specific to its corresponding filesystem object that are operated on by the driver of that driver-specific storage volume.

4. The method of claim 3 wherein the primary data structure is a B+ tree with keys based on filesystem objects and pointers to secondary data structures serving as values in key-value pairs.

5. The method of claim 4 wherein the B+ tree includes a plurality of nodes, each node occupying a single filesystem block.

6. The method of claim 4 wherein the keys based on filesystem objects are unique identifiers of filesystem objects that have been processed with non-cryptographic hashing.

7. The method of claim 4 wherein each secondary data structure is an embedded B+ tree with keys based on attributes of filesystem objects and values of those attributes serving as values in key-value pairs.

8. The method of claim 7 wherein the embedded B+ trees include a plurality of nodes, each node occupying a single filesystem block.

9. The method of claim 7 wherein the keys based on attributes of filesystem objects are locally-unique identifiers of attributes that have been processed with non-cryptographic hashing.

10. The method of claim 1 wherein the plurality of drivers are layered storage service drivers configured to send and receive storage operations according to a same interface shared with the other layered storage service drivers.

11. The method of claim 1 wherein:
- a first driver of the plurality is a copy driver configured to copy data from a first filesystem object to a second filesystem object; and
- a second driver of the plurality is a collator driver configured to:
  - receive a plurality of storage commands from at least one other driver of the plurality;
  - combine the plurality of storage commands into a combined storage command; and
  - issue the combined storage command to yet another driver of the plurality.

12. An apparatus comprising processing circuitry coupled to memory configured to store filesystem object attributes in connection with a plurality of drivers, each driver of the plurality being configured to operate on a respective set of filesystem objects, by:
- for each driver of the plurality, creating a respective driver-specific storage volume, each driver of the plurality of drivers being a software programming construct constructed and arranged to perform volume-based storage activities and providing a respective layer of operational processing, each driver-specific storage volume created for a different driver of the plurality of drivers in a one-to-one relationship;
- storing, within each driver-specific storage volume, an indicator of each of the set of filesystem objects with which the respective driver is configured to operate and, for each indicated filesystem object, attributes specific to the respective filesystem object operated on by the driver of that driver-specific storage volume; and
- while operating a particular driver of the plurality on a particular filesystem object, using values of the stored attributes specific to that particular filesystem object operated on by that particular driver,
- wherein storing, within each driver-specific storage volume, attributes specific to respective filesystem objects operated on by the driver of that driver-specific storage volume includes providing first and second B+ trees, the first B+ tree mapping identifiers of user volumes to respective leaves, the leaves corresponding to respective user volumes and including pointers to respective attribute realms, the second B+ tree mapping the respective attribute realms to respective attribute values.

13. A computer program product comprising a non-transitory storage medium storing instructions, which, when performed by computing circuitry of a data storage apparatus, cause the data storage apparatus to store filesystem object attributes in connection with a plurality of drivers, each driver of the plurality being configured to operate on a respective set of filesystem objects, by:
- for each driver of the plurality, creating a respective driver-specific storage volume, each driver of the plurality of drivers being a software programming construct constructed and arranged to perform volume-based storage activities and providing a respective layer of operational processing, each driver-specific storage volume created for a different driver of the plurality of drivers in a one-to-one relationship;
- storing, within each driver-specific storage volume, an indicator of each of the set of filesystem objects with which the respective driver is configured to operate and, for each indicated filesystem object, attributes specific to the respective filesystem object operated on by the driver of that driver-specific storage volume; and
- while operating a particular driver of the plurality on a particular filesystem object, using values of the stored attributes specific to that particular filesystem object operated on by that particular driver,
- wherein storing, within each driver-specific storage volume, attributes specific to respective filesystem objects operated on by the driver of that driver-specific storage volume includes providing first and second B+ trees, the first B+ tree mapping identifiers of user volumes to respective leaves, the leaves corresponding to respective user volumes and including pointers to respective attribute realms, the second B+ tree mapping the respective attribute realms to respective attribute values.

14. The computer program product of claim 13 wherein:
- each respective set of filesystem objects includes a user-accessible storage volume; and
- creating the respective driver-specific storage volume for each driver of the plurality includes creating the driver-specific storage volumes as hidden storage volumes that are not accessible to users.

15. The computer program product of claim 13 wherein storing attributes specific to respective filesystem objects within each driver-specific storage volume includes:
- storing, in a primary data structure within that driver-specific storage volume, a first set of pointers that respectively point to secondary data structures, each pointer of the first set corresponding to a respective filesystem object operated on by the driver of that driver-specific storage volume; and storing the secondary data structures pointed to by the first set of pointers within that driver-specific storage volume, each of the secondary data structures corresponding to a respective filesystem object operated on by the driver of that driver-specific storage volume, each secondary data structure storing the attributes specific to its corresponding filesystem object that are operated on by the driver of that driver-specific storage volume.

16. The computer program product of claim 15 wherein the primary data structure is a B+ tree with keys based on filesystem objects and pointers to secondary data structures serving as values in key-value pairs.

17. The computer program product of claim 16 wherein the B+ tree includes a plurality of nodes, each node occupying a single filesystem block.

18. The computer program product of claim 16 wherein the keys based on filesystem objects are unique identifiers of filesystem objects that have been processed with non-cryptographic hashing.

19. The computer program product of claim 16 wherein each secondary data structure is an embedded B+ tree with keys based on attributes of filesystem objects and values of those attributes serving as values in key-value pairs.

20. The computer program product of claim 19 wherein the embedded B+ trees include a plurality of nodes, each node occupying a single filesystem block.

* * * * *